United States Patent [19]

Schoenig, Jr. et al.

[11] Patent Number: 4,620,099
[45] Date of Patent: Oct. 28, 1986

[54] AUTOMATED MONITORING OF FISSILE AND FERTILE MATERIALS IN INCINERATOR RESIDUE

[75] Inventors: Frederick C. Schoenig, Jr., Wilmington, N.C.; Sharon G. Glendinning, Palo Alto; George W. Tunnell, Foster City, both of Calif.; Martin S. Zucker, East Moriches, N.Y.

[73] Assignee: General Electric Company, San Jose, Calif.

[21] Appl. No.: 526,582

[22] Filed: Aug. 26, 1983

[51] Int. Cl.⁴ ............................................. G01F 23/00
[52] U.S. Cl. .................................. 250/358.1; 250/390
[58] Field of Search ............ 250/358.1, 359.1, 361 R, 250/363 R, 366, 367, 390, 392, 432 R, 433, 496; 376/153

[56] References Cited

U.S. PATENT DOCUMENTS

| | | |
|---|---|---|
| 2,928,965 | 3/1960 | Bayard et al. |
| 3,389,254 | 6/1968 | Russell ................................. 250/362 |
| 3,492,479 | 1/1970 | Lowery et al. ................. 250/390 C |
| 3,707,631 | 12/1972 | Untermyer ..................... 250/390 C |
| 3,786,256 | 1/1974 | Untermyer ..................... 250/363 R |
| 4,053,771 | 10/1977 | Ande et al. ..................... 250/390 C |

OTHER PUBLICATIONS

Cole, H. A., "An Automatic Drum Scanning System . . ." Nuc. Inst. & Met. 65, (1968) pp. 45–57.

Primary Examiner—Janice A. Howell
Attorney, Agent, or Firm—Ivor J. James, Jr.; Raymond G. Simkins

[57] ABSTRACT

A system for determining the radioactive materials content of the ash or residue from an incinerator of contaminated materials contained in cans. The system includes can handling apparatus, a neutron source for activating the material and neutron and gamma ray detectors for detecting emissions from the materials by which fissile/fertile material content is determined.

3 Claims, 7 Drawing Figures

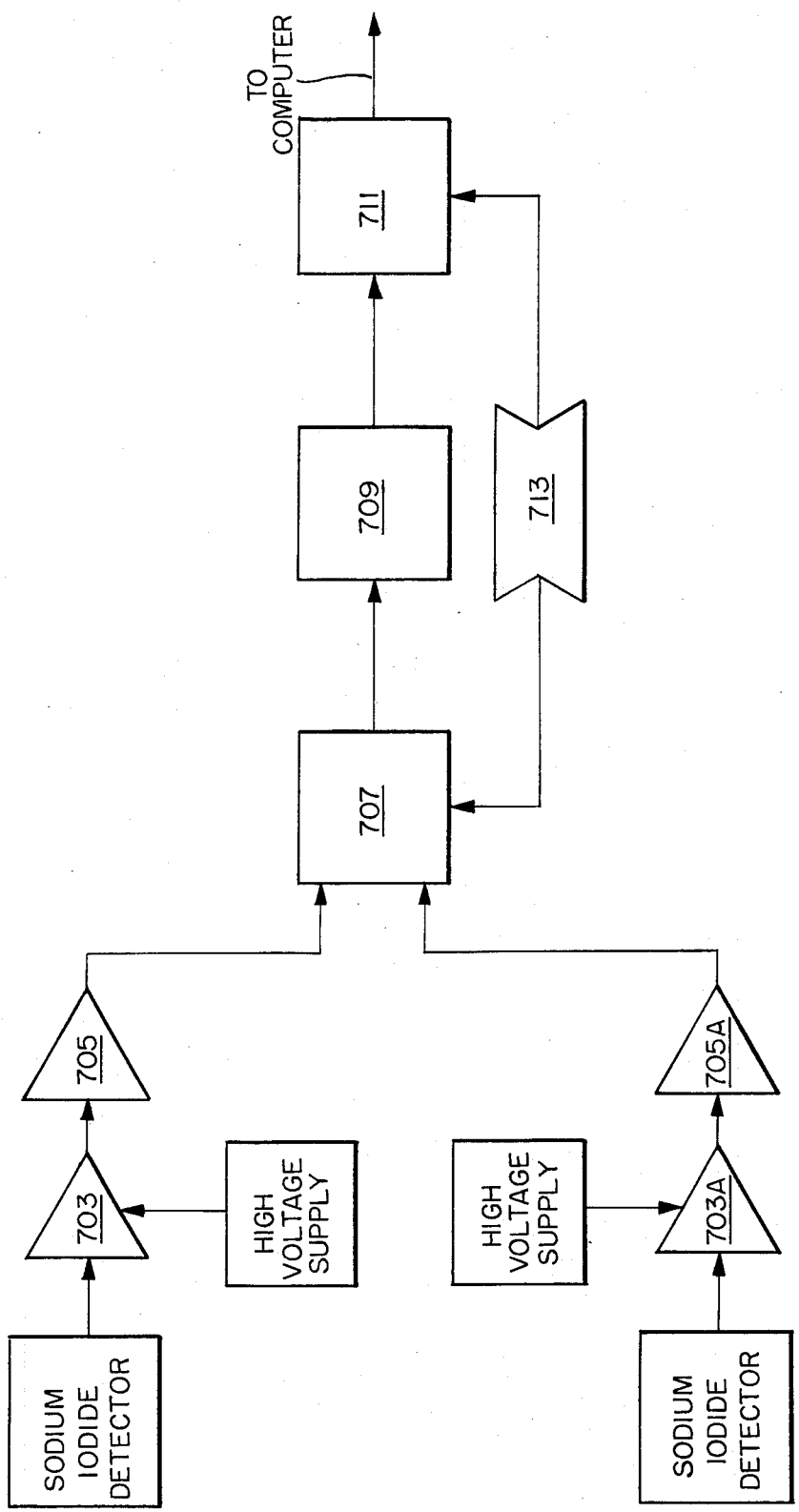

AUTOMATED MONITORING OF FISSILE AND FERTILE MATERIALS IN INCINERATOR RESIDUE

BACKGROUND AND SUMMARY

The present invention relates to apparatus henceforth called the ash can monitor, which provides fissile and/or fertile material accountability measurements of the output of an incinerator. The ash can monitor disclosed herein is intended to measure the fissile/fertile material content of incinerator ash which is deposited in containers after leaving an incinerator such as described in a copending application Ser. No. 526,578 filed on Aug. 26, 1983 and assigned to the same assignee as this application.

The maintenance of records related to the quantity of fissile/fertile material is necessary to the monitoring of such materials as a precaution against such material being diverted to unauthorized use. The present invention is concerned with the monitoring of the quantities of fissile/fertile materials recovered from the incineration of contaminated matter.

It is also important to monitor the flow of input and output fissile material through the incineration process to guard against accidental nuclear criticality. This device provides the output measurement whereas a device described in application Ser. No. 526,578 provides the input fissile material measurement.

It is an object of this invention to utilize apparatus to assay fissile/fertile material contained in ash resulting from incineration of contaminated materials, where such ash is obtained from an incinerator output and deposited in a container such as a cylindrical container (can), adapted for use with the specific embodiment herein disclosed.

It is a further object of the invention to utilize apparatus in a diverse system for confirming a primary assay of fissile/fertile material contained in the ash obtained from an incinerator output and deposited in a cylindrical container.

Other objects and advantages of the invention will be more clearly understood by those skilled in the art from the following detailed description when taken in connection with the accompanying drawings, wherein:

FIG. 7 is a block diagram of the electronics for the sodium iodide detectors.

For ease in describing and understanding the invention herein, there is first described the mechanical handling apparatus, followed by a description of the signal processing portion of the invention.

THE MECHANICAL HANDLING APPARATUS

Figure 1:
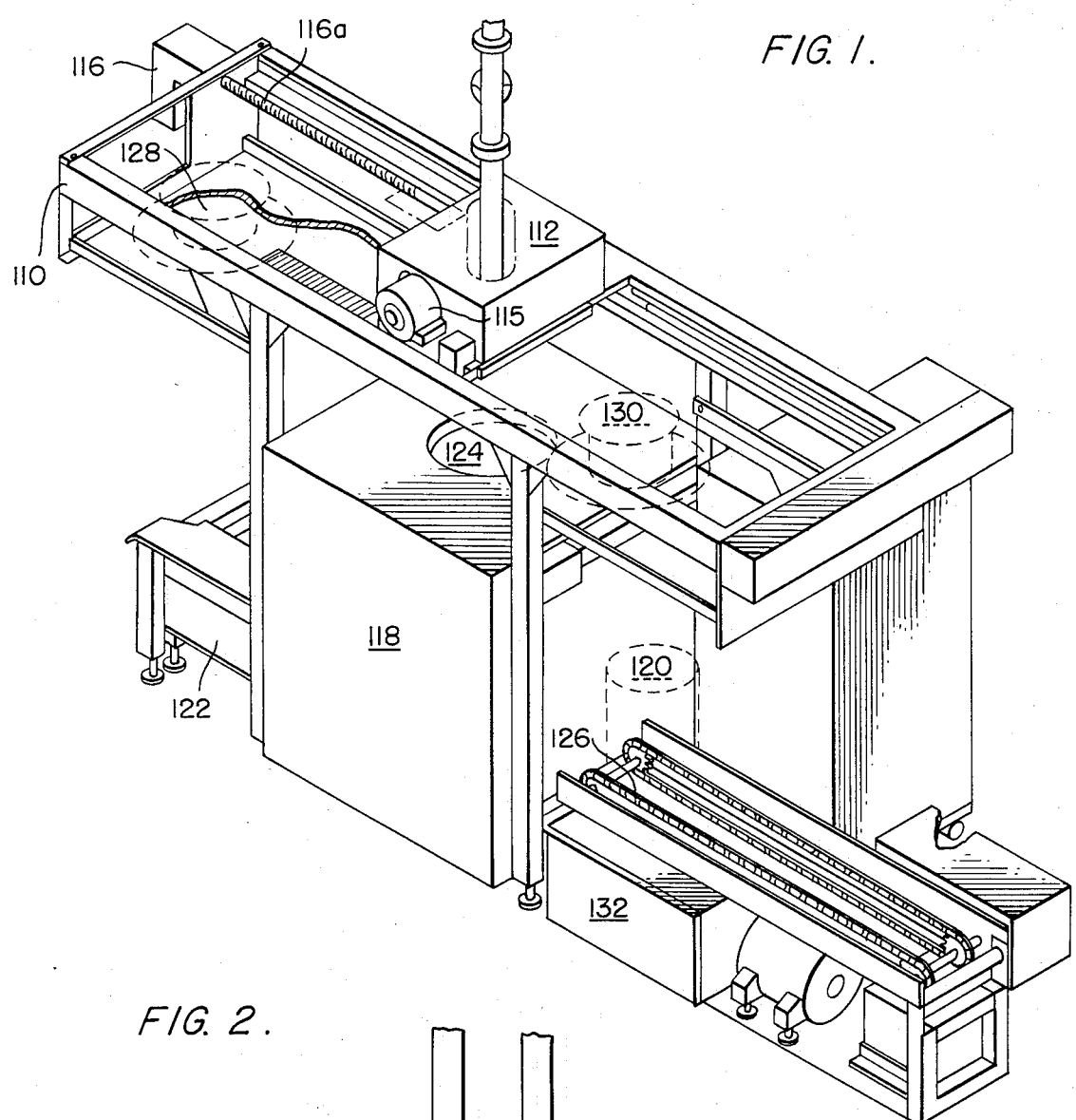
FIG. 1 is a view in isometric of one embodiment of the invention.
Figure 2:
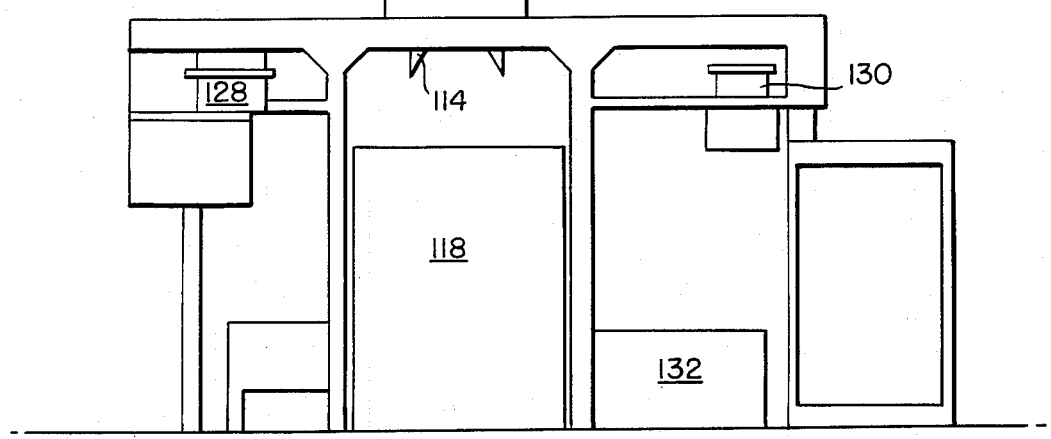
FIG. 2 is a front view of the apparatus of FIG. 1.

Referring to FIG. 1, there is shown a frame 110 to which is mounted a movable support 112 for a robot type gripper assembly 114 (FIG. 2) adapted for horizonal and vertical positioning. Movable support monitor 112, and thus robot type gripper assembly 114, is movable longitudinally through activation of a geared motor 116 mounted to frame 110 and the motor drives a long screw threaded member 116A. Vertical motion is also accomplished by a motor 115 used to lower and raise the gripper assembly in a similar manner. The frame 110 has a monitor or counting well 118 positioned respective the frame to permit the gripper assembly 114 under computer control of a Digital Equipment 11/34 computer to selectively pick up a can 120 from a scale 122 and deposit the can in an opening 124 of the well 118, and upon completion of predetermined measurements to pick up the can 120 and convey the same to an exit queue 126.

The robot type gripper assembly is programmed (via the Digital Equipment 11/34 computer—not shown) to position, at one time, a neutron reflecting plug 128 over opening 124, causing a can placed therein to be enclosed in the well, or at another time to position an active (i.e., containing a neutron source) plug 130 in a like position, but for a purpose more fully hereinafter explained.

For the purpose of proper position and functioning of the robot type gripper assembly, a plurality of sensors are utilized for sending data to the computer utilized for control and operation of the the gripper assembly 114 as well as for ascertaining the position of the can 120 during the can monitor system operation.

Figure 3:
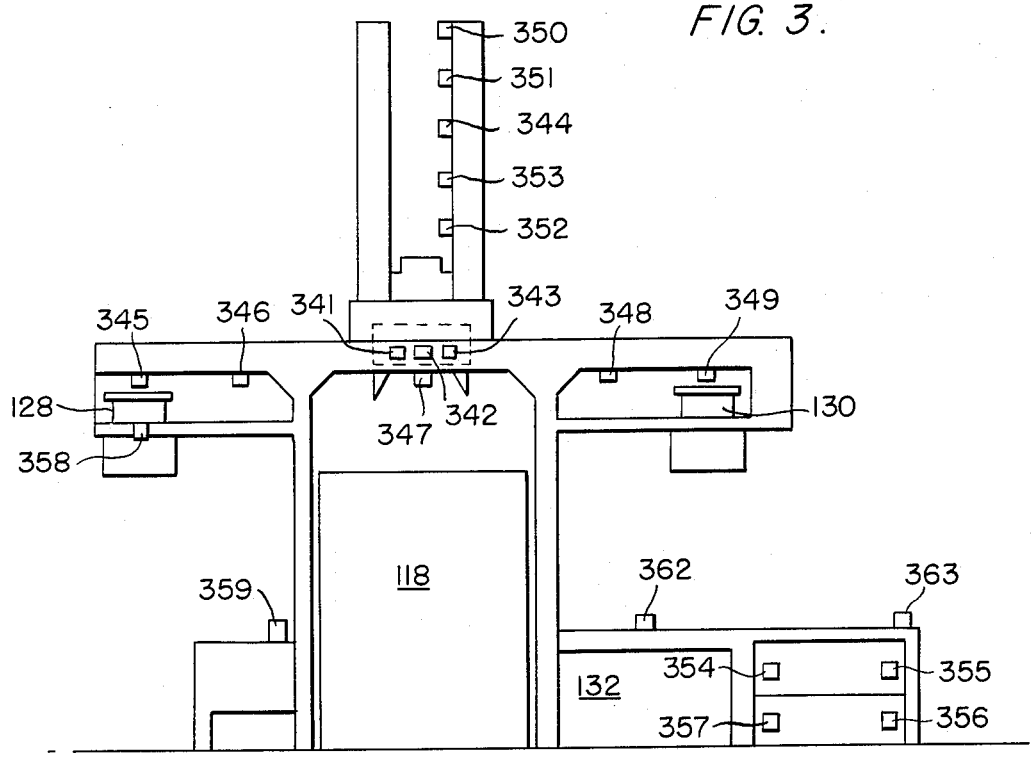
FIG. 3 is a side view detailing the location of sensors utilized in an embodiment of the invention.

Referring to FIG. 3, the sensors 341, 342 and 343 are strategically placed and utilized for determining the condition of the gripper as either open or closed or occupied or unoccupied respectively. Sensor 344 is utilized to determine when plug 128 or 130 is properly positioned in well 118. Sensor 345 senses when gripper assembly 114 is properly positioned with respect to plug 128. Sensor 346 is utilized to determine the proper position for the gripper assembly to permit the assembly to descend and grasp a can sensed to be on scale 122 by sensor 359. The sensor 347 is placed to sense the proper position for the gripper assembly 114 to deposit a can into well 118. Sensor 348 is positioned to sense and determine the proper position for gripper assembly 114 to deposit a can on queue 126, at which position the can is sensed by a sensor 362. A sensors 349 senses proper position of gripper assembly 114 with respect to source plug 130. The sensor 350 is utilized for sensing the top position of gripper assembly 114. A sensor 351 is utilized to determine the vertical position of the gripper assembly 114 when depositing plug 180 and sensor 352 is utilized for determining the position of the gripper assembly 114 respective a can resting on scale 122. Sensor 353 is used to determine the position for a can in the well 118. Sensors 354, 355, 356 and 357 are utilized to sense the positions of two neutron sources 501 and 503 contained in container members 132 which containers are moved by teleflex type cables to a position under counting well 118; one source is Californium-252 used to permit calibration of the detectors associated with the well. The other is an Americium-241 Lithium source used in the active mode. Sensor 358 is utilized to sense that plug 128 is in its home position. The sensor 362 is used to sense the presence of a can at a first position on the output conveyor 126, with a sensor 363 utilized to detect a can at the end of the output or discharge conveyor 126. The sensors referred to above are of types well known in the art and may be positioned at suitable positions relative to the items to be monitored to obtain the results desired. Further the outputs obtained or observed by the sensors are fed to the central control computer Digital Equipment Type 11/34 programmed to instruct the mechanical handling of the cans used with the invention in a manner hereinafter described.

In the mechanical operation of the apparatus shown in FIG. 1, a can, containing radioactive ashes which had been prepared by having the radioactive ash placed in the can after it had been screened to limit particles to a predetermined size, is conveyed on an input conveyor (not shown) to scale 122, which is part of the conveyor, whereat the can and contents are electronically weighed and determined to have an ash content of less than a predetermined amount, as for example 35 kilograms for the ash and can. If the predetermined maximum weight is exceeded, the can is diverted for later reworking to reduce the excess weight. At the time of weighing, the can, which has a distinctive identification number, has that number entered into the computer by means well known in the art, and upon the weight being proper and the identification number having been read into the computer, which was chosen as herein before stated to be a Digital Equipment, Model 11/34, the computer instructs the gripper head assembly 112 to move to the position above the can on the scale, lower the gripper portion, grip the can and carry the can to a position where the can is deposited in well 118. The gripper portion is then instructed by the computer hereinbefore referred to, to proceed and pick up plug 128 and deposit the same in the opening 124 in well 118.

Figure 4:
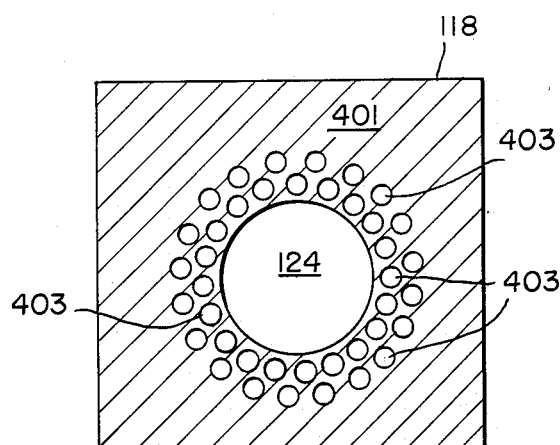
FIG. 4 is a top view looking into the well of the detector assembly of FIGS. 1 and 2.
Figure 5:
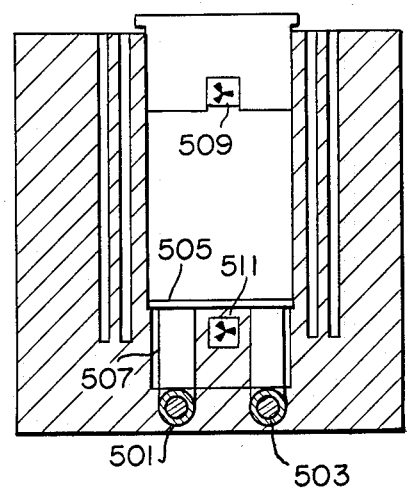
FIG. 5 is a sectional view of the well of FIG. 4.

A top view of the well 118 is shown in FIG. 4. Referring to FIG. 4 in detail the well has a main body member 401 formed of polyethylene wherein is provided the well 118. A plurality of neutron detectors 403 are imbedded in the polyethylene in a two concentric circular array around the well 118 and are for purposes of the present embodiment comprised of 42 BF3 detectors in number. For purposes of operation the 42 BF3 proportional counter neutron detectors are divided in sets of three forming a first group of seven sets of three and a second group of seven sets of three to form redundant detector systems FIG. 5 is a sectional view taken along line 5—5 of FIG. 4, and shows the detectors 403 as well as neutron sources 511 and 509.

THE ELECTRONIC CIRCUITRY

Figure 6:
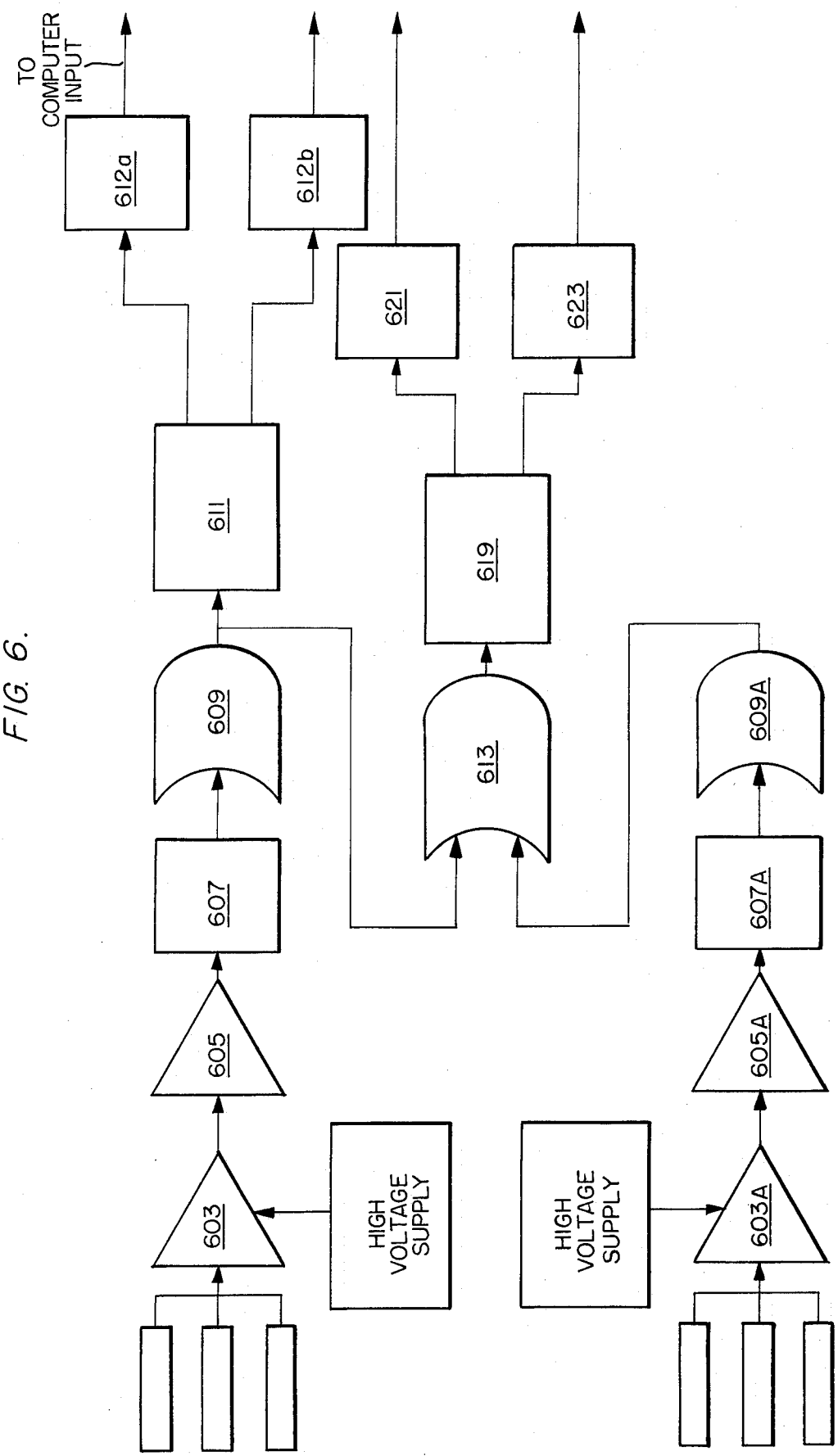
FIG. 6 is a block diagram of the electronics of a redundant detector system utilizing neutron radiation detectors.

FIG. 6 is a block diagram illustrative of the electronic interconnection for the redundant BF3 detector arrangement. As has previously been indicated three BF3 neutron detectors are connected in parallel to form a set of such neutron detectors. Since the current output obtained from the BF3 neutron detectors is low in amplitude the output of a set of three, connected in parallel, is first amplified by a charge-sensitive preamplifier 603 one type of which may be a Brookhaven National Laboratory Design 10203-11. The output of preamplifier 603 is further amplified in a second amplifier 605 which may be a Canberra type 2011 amplifier. The signal having been amplified by preamplifier 603 and second amplifier 605 is then passed on to a discriminator 607 one type of which is known in the art as Canberra type 2032. As there are seven sets of the three BF3 neutron detectors in a group each set of three detectors provides an output from a discriminator as 607 and each of said outputs is then fed to a first custom OR gate 609. The output of first custom OR gate 609 is fed to a correlation unit 611 and to one input of a two input custom OR gate 613. Correlation unit 611 also provides two outputs which are fed to distinctive parallel input gates 612a and 612b which may be of a type known as Kinetic Systems 3472F1B. The input gates 612a and 612b are fed to the Digital Equipment 11/34 computer for processing of the information which appears at the output of input gates 612a and 612b. The second group of BF3 detectors are similarly connected as the first group through a preamplifier 603A, a second amplifier 605A, a discriminator 607A and third custom OR gate 609A with the output of third custom OR gate 609A being fed as a second input to second custom OR gate 613. The output of second custom OR gate 613 is fed to a second correlation unit 619 with the output of correlation unit 619 being fed into two additional input gates 621 and 623, the outputs of which input gates are also fed to the computer to provide the information as indicated.

FIG. 7 shows one embodiment of the sodium iodide detector system. As shown in FIG. 5 two sodium iodide detectors 501 and 503 are positioned a predetermined distance below the bottom of a can in the well 118. The detectors are shielded from thermal neutrons and low energy gamma rays by a 30-mil layer of cadmium 505 which lines the bottom of the well plus an additional layer of cadmium 507 over the detectors themselves. Since the voltage output of the sodium iodide detectors is also low in amplitude one sodium iodide detector output is passed first to a preamplifier 703 and then to an amplifier 705 which may be of a type known as a Canberra Model 2011. The circuit of the second sodium iodide detector is a duplicate of the one sodium iodide detector hereinabove described, with corresponding elements having the same reference numerals but with the addition of A thereto. The outputs of the second amplifiers 705 and 705A for each of the sodium iodide channels is passed to a mixer router 707 the output of mixer router 707 is passed through an analog to digital converter 709 and then to a Canberra Series 40 multichannel analyzer 711, with the output of the multichannel analyzer 711 being fed to the computer. Data in the system hereinbefore described are taken in three modes—a verification mode, a passive mode and an active mode. The verification mode is utilized before the measurements of each can to insure that the neutron well coincidence counter and associated hardware are functioning properly. The verification scan is performed by utilizing the 5.0 uCi Californium-252 source 501 placed at the bottom of the well and with the neutron reflecting plug 128 in place. Three counts are taken and the results are compared with count rates previously determined, and corrected for the Californium-252 source decay. The system is considered to be operating in a proper manner if the counts agree within statistical limits. After the verification has been completed and the neutron reflecting plug 128 is returned to its home position the gripper head positions itself to pick up a can at the scale 122. After picking the can up, the gripper head conveys the can to the well 118. After depositing the can in well 118 the gripper head proceeds to pick up the reflecting plug 128 and convey it to the opening 124 to completely close the well around the can. At this point a passive scan is taken for 20 counts. Upon completion of the passive scan two 150 mCi americium 241 lithium sources 509 and 511 are positioned above and below the can respectively and the active scan is taken in a mode similar to the passive scan. The computer causes a printer associated therewith to print out the data for the identified can that was monitored.

The results provided are: (1) fissile and fertile material content (from redundant neutron detection) and (2) fissile and fertile material content from redundant detection of gamma radiation. These results are obtained by comparison of the derived count rates with calibration curves obtained from standards of known compositions.

Having described the apparatus and the method utilized for assaying the amount of U-235 and U-238 present in ash which was discharged through a sieve to a can, it will be obvious to those skilled in the art that modifications may be made thereto without departing from the spirit and scope of the invention herein claimed.

What is claimed is:

1. Apparatus for determining the fissile and fertile material content of incinerator residue contained in a manipulatable container, comprising: a main body member formed of neutron moderating material and formed with a well for receiving said container; a first plug formed of neutron reflecting material for closing the top of said well; a second plug containing a first neutron source for alternatively closing the top of said well and for directing neutrons into said well; a second neutron source selectively positionable in the bottom of said well for directing neutrons into said well; manipulating means for placing said container in said well and removing said container therefrom and for selectively placing one of said first and second plugs in the top of said well; a plurality of neutron detectors positioned within the neutron moderating material of said main body member around the sides of said well; at least one gamma ray detector positioned adjacent the bottom of said well; and means for receiving and processing the signals from said neutron and gamma ray detectors when said container is in said well for determining the fissile and fertile material content of the incinerator residue in said container.

2. The apparatus of claim 1 including means for weighing said container for determining the weight of said incinerator residue therein.

3. A method for determining the fissile and fertile material content of incinerator residue contained in a manipulatable container comprising the steps of:
   (1) providing a well in a body of neutron moderating material for receiving said container;
   (2) providing a plurality of neutron detectors in passages in said body surrounding said well;
   (3) providing at least one gamma ray detector positioned adjacent the bottom of said well;
   (4) providing signal processing means for receiving and analyzing signals from said neutron and gamma ray detectors;
   (5) performing a verification scan, including placing a neutron reflecting plug in the top of said well, placing a neutron source adjacent the bottom of said well for directing neutrons into said well, and analyzing the resulting signals from said neutron detectors to verify functioning thereof;
   (6) removing said neutron source from adjacent the bottom of said well;
   (7) placing said container in said well including replacing said neutron reflecting plug in the top of said well;
   (8) performing a passive scan of the spontaneous neutron and gamma ray emissions from said material in said container including recording the signals from said neutron and gamma ray detectors for a predetermined period;
   (9) placing a neutron source adjacent at least one end of said well for directing neutrons into said well and into said material in said container for activation of said material;
   (10) performing an active scan of the activated emissions from said material in said container including recording the signals from said neutron and gamma ray detectors for a predetermined period; and
   (11) comparing the signals obtained by the passive and active scanning steps of (8) and (10) to signals obtained from a standard of known composition whereby the fissile and fertile content of the material in said container is determined.

* * * * *